Figure 1:
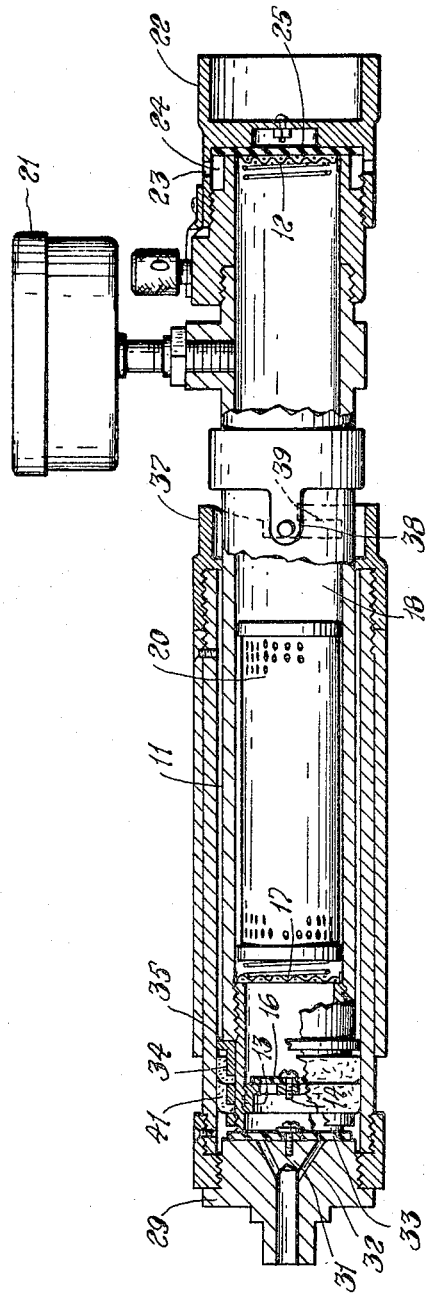

Aug. 16, 1966  O. E. DENGLER  3,266,869
CARBON DIOXIDE ANALYZER

Filed Sept. 30, 1963  3 Sheets-Sheet 1

INVENTOR.
OSKAR E. DENGLER
BY Edward F. Costigan
Louis B. Appleban
ATTORNEYS

Aug. 16, 1966  O. E. DENGLER  3,266,869
CARBON DIOXIDE ANALYZER
Filed Sept. 30, 1963  3 Sheets-Sheet 2

INVENTOR.
OSKAR E. DENGLER
BY Edward R. Costigan
Louis B. Appleba
ATTORNEYS

United States Patent Office 3,266,869
Patented August 16, 1966

3,266,869
CARBON DIOXIDE ANALYZER
Oskar E. Dengler, 401 Williams St., New London, Conn.
Filed Sept. 30, 1963, Ser. No. 312,793
1 Claim. (Cl. 23—254)

The invention described herein may be manufactured and used by or for the Government of the United States of America for governmental purposes without the payment of any royalties thereon or therefor.

This invention relates to the analysis of air for the determination of its carbon dioxide content. More particularly, this invention pertains to an apparatus for use in determining the carbon dioxide content of air.

In the past, submarines have been described as surface vessels capable of limited periods of submergence. As such, the percentage of carbon dioxide that accumulates within the habitable space of the submerged vessel was not a limiting factor in use, due to the efficient degree of ventilation that is accomplished during periodic surface operations. However, with the advent of the nuclear powered submarine, one of the ultimate objectives of the Navy has become a submerged vessel which rarely operates on the surface. As a result, air renewal and accumulation of carbon dioxide in the atmosphere of the submerged vessel becomes a problem.

It is of the greatest importance to the Navy to know what percentage of carbon dioxide is present in the atmosphere of the vessel at any one time, because the onset of such conditions as asphyxia are so gradual as to be insidious under ordinary conditions. At low concentrations, carbon dioxide is a respiratory stimulant, but at great enough concentrations it will cause the collapse of an individual. When the inspired air at atmospheric pressure contains three percent carbon dioxide, respiration often becomes rapid and shallow, and is accompanied by a simple headache. When the percentage is raised to six percent, there is impairment of the efficiency and judgment with respiratory distress. At nine percent and above, there is loss of consciousness, with ensuing coma and death if prolonged. It is therefore important to know when the accumulation of carbon dioxide has reached any of these levels, so that satisfactory safety procedures can be resorted to in order to avoid discomfort, inefficiency and disaster.

There is a three-fold problem in the attempt to solve the difficulties encountered in the appraisal of the amount of carbon dioxide in the atmosphere of a submerged submarine. First, a representative sample of the atmosphere must be acquired; second, the sample must be automatically analyzed for carbon dioxide quickly and accurately; third, the method of analysis must have utility in the closed atmosphere of all compartments of a submarine, the atmosphere of which may sometimes contain gaseous explosive compartments.

The apparatus of this invention will determine the amount of carbon dioxide in the atmosphere of a submerged vessel, and not only will the determination be made accurately and quickly but also the apparatus can be manually operated with ease. The accuracy of the present apparatus is about plus or minus 0.10 percent. This accuracy is unaffected by the presence of the conventional gases ordinarily found in some of the compartments of a submerged vessel. Also of importance is the fact that the apparatus is compact, light in weight and does not depend upon electricity for its operation, which makes it acceptable in all compartments of a submarine.

An object of this invention is to provide an apparatus for the determination of carbon dioxide in the atmosphere.

Another object is to provide a portable carbon dioxide analyzer of low fabrication and maintenance cost, light weight, high durability and facile use under a wide variety of service conditions.

Figure 2:
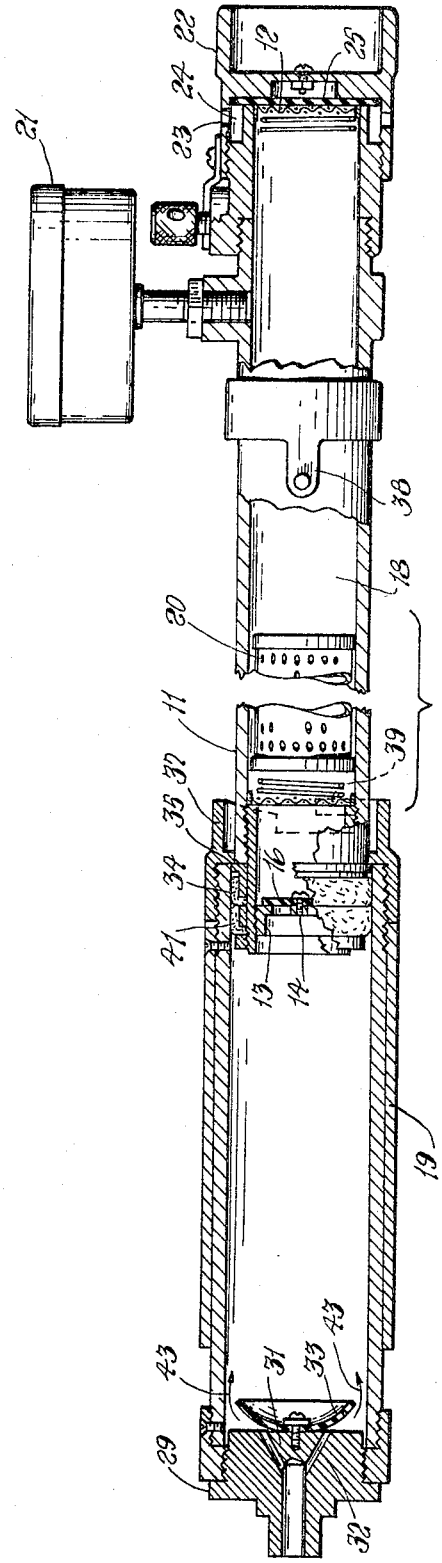
Figure 3:
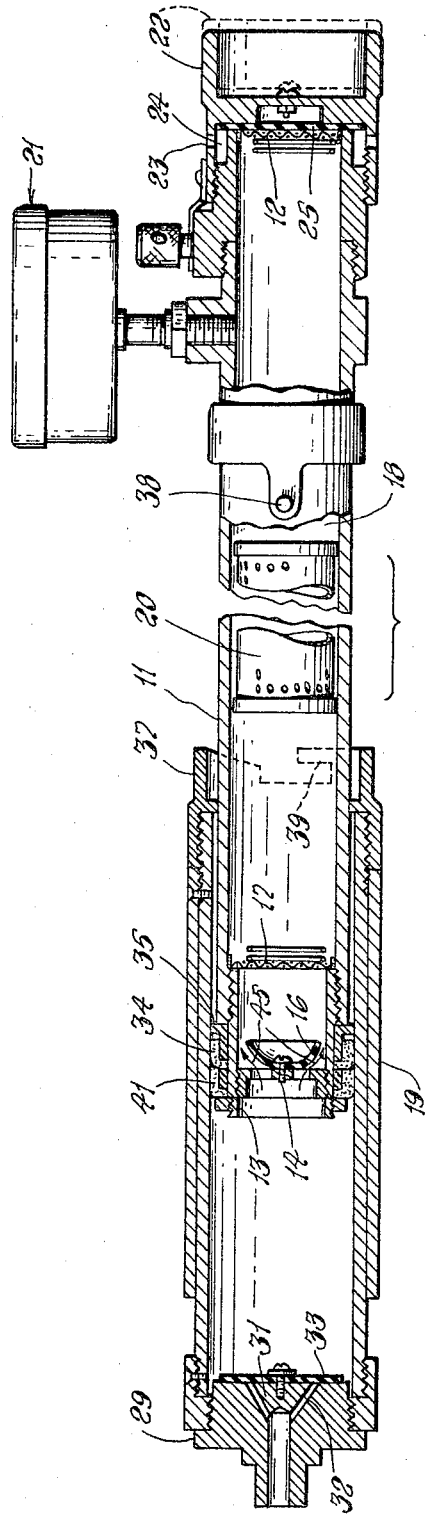

Other objects and many of the attendant advantages will be readily understood by reference to the following detailed description when considered in connection with the accompanying drawings, wherein:

FIG. 1 is a diagrammatic side view of the present apparatus;
FIG. 2 is a diagrammatic side view showing the capturing of a sample; and
FIG. 3 is a diagrammatic side view showing the entrance of the sample into the extraction chamber.

Similar numerals refer to similar parts throughout the several views.

The apparatus, as shown in FIG. 1, is provided with a base inner cylinder 11 of open end construction within one end of which is positioned recessed screen 12 and the other end of which is provided with inserted end member 13. The latter element is provided with a pressure actuated intake valve 14 having a plurality of holes over which is mounted a centrally affixed flexible diaphragm 16. The valve 14, which is adjacent to an inner recessed screen 17, regulates the admittance of a gaseous sample to the extraction chamber 18 within the inner cylinder 11 in response to an increase in pressure produced by outer cylinder 19 in a manner hereinafter to be described.

The inner cylinder 11 is provided with a perforated cylindrical cartridge 20 of closed end construction which is freely slidable within the extraction chamber 18 between recessed screens 12 and 17. The cartridge 19 houses an absorbent which preferentially extracts carbon dioxide from the gaseous sample within the extraction chamber 18. The differential in pressure produced by such extraction is measured by gauge 21, which is affixed to the exterior of the inner cylinder 11 and communicates with the extraction chamber 18. The gauge is provided with a facing 23 which is calibrated to indicate the change in pressure in related percent carbon dioxide extracted from the gaseous sample.

The exhaust end of the inner cylinder 11 is provided with end member 22 having a series of exhaust orifices 23 in spaced relationship around the periphery thereof which communicate between the atmosphere and the exhaust chamber 24 described by the end member 22. A pressure-actuated flexible diaphragm 25, which is adapted to fit over the area circumscribed by the exhaust end of the inner cylinder 11, is recessed within the end member 22 adjacent to the exhaust orifice 23. The diaphragm 25 controls the exhausting of air from the extraction chamber 18 in response to an increase in pressure within the cylinder 11.

The end of inner cylinder 11, which is fitted with intake valve 14, is telescopically inserted into outer cylinder 19, which is of open end construction. The free end of the outer cylinder 19 is provided with end member 29 having a suction-actuated intake valve 31, which is composed of a member having an array of transverse holes 32 over which is mounted a centrally affixed flexible diaphragm 33. The extent of outward movement of the outer cylinder 19 is controlled by stop 34, which comes in contact with the inner shoulder 35 of the circumferential locking sleeve 37 fitted around the end of the outer cylinder 19. The extent of the inward movement of the outer cylinder 19 is controlled by locking pin 38, which engages the hook-like lock 39 of the circumferential locking sleeve 37.

The outer cylinder 19 is securely gripped and revolved one half a rotation counterclockwise in order to disengage the hook-like lock 39 from locking pin 38. As shown in FIG. 2, the outer cylinder 19 is then moved in an outwardly direction upon inner cylinder 11 until stop 34 engages the inner shoulder 35 of the circumferential locking sleeve 37. This produces a partial vacuum within the outer cylinder 19 due to the action of the seal 41, which is disposed between the cylinders, and circumferentially secured to the exterior of the inner cylinder 11. The partial vacuum produced functions to open intake valve 31, allowing air to rush into the outer cylinder 19 as indicated by the arrows 43 in FIG. 2. Air will enter the outer cylinder 19 until the pressure therein is equalized with the pressure of the outside atmosphere and valve 31 will close. At this point, the valve 14 of the inner cylinder is maintained in a closed position because the pressure inside the inner extraction chamber 18 is also equalized with the pressure inside the outer cylinder 19 and the entrapped sample will remain within the outer cylinder 19.

As the outer cylinder 19 is forced inwardly towards the inner cylinder 11, as shown in FIG. 3, the increase in pressure within the outer cylinder will maintain the intake valve 31 in the closed position, but will force the intake valve 14 on the inner cylinder 11 to open and the entrapped sample will enter the inner cylinder. The valve 14 will open, as indicated by arrows 45, because the pressure acting on the exterior of the flexible diaphragm 16 is greater than the back-up pressure within the inner cylinder 11. Due to the fact that the volume of the outer cylinder 19 is equal to or greater than the volume of the inner cylinder 11, the air entering the inner cylinder 11 will force the air contained therein to be fully exhausted from the cylinder through exhaust orifices 23. The diaphragm or exhaust valve 25, which controls this action, will be forced to open by the increase in pressure within the inner cylinder 11 due to the compressive movement of the outer cylinder 19. The inward movement of the outer cylinder 19 will be checked by the stopping action of the pin 38 against the circumferential sleeve 37. The outer cylinder 27 is then rotated clockwise about its axis until locking pin 38 fully engages hook-like lock 39. When the pressure inside the inner cylinder 11 is equalized with atmospheric pressure, the diaphragm 25 will close and the air sample will be entrapped within the extraction chamber.

At this point, the cartridge 20 is gently slid from side to side within the extraction chamber 18 by sequentially lifting and depressing one end of the apparatus. During this operation, the absorbent contained in the cartridge 20 will essentially come into contact with the entire air sample within the inner cylinder 11. As the absorbent extracts carbon dioxide from the air sample, a partial vacuum is produced within the inner cylinder. This vacuum is not only measurable but is also directly correlatable to the amount of carbon dioxide extracted from the sample. The gauge, which communicates with the sample within the extraction chamber 18, is used to measure this pressure change and to indicate the change in pressure in related percent carbon dioxide extracted from the sample.

Obviously, many modifications and variations of the present invention are possible in light of the above teaching. For instance there are many known absorbents which may be used in the apparatus although we have preferentially utilized soda-lime. Soda lime, because of its preferential absorption character, i.e. its strange affinity for carbon dioxide, has a greater performance reliability. It is therefore to be understood that within the scope of the appended claims, the invention may be practiced otherwise than as described.

I claim:

A carbon dioxide analyzer comprising:

an outer hollow cylinder of open end construction;

an end member fitted on one of said ends of said cylinder, said end member having an array of transverse holes communicating between the atmosphere and the interior of said cylinder;

a centrally affixed suction-actuated flexible diaphragm mounted over the interior side of said holes;

an inner hollow cylinder of open end construction one end of which is telescopically inserted into the open end of said outer cylinder;

a pressure-activated intake valve fitted within the inserted end of said inner cylinder;

a perforated cartridge containing a carbon dioxide absorbent slidably inserted into said inner cylinder;

a second end member secured over the open end of said inner cylinder, said second end member having a plurality of exhaust orifices;

a second pressure activated flexible diaphragm fitted in said second end member and covering said open end of said inner cylinder; and differential pressure measuring means communicating with the interior of said inner cylinder.

References Cited by the Examiner

UNITED STATES PATENTS

| | | | |
|---|---|---|---|
| 2,069,035 | 1/1937 | Hollman | 23—254 |
| 2,631,088 | 3/1953 | Guild | 23—254 |
| 3,123,444 | 3/1964 | Foxwell et al. | 23—254 |

MORRIS O. WOLK, *Primary Examiner.*

JAMES H. TAYMAN, JR., *Examiner.*

JAMES J. MULLEN, *Assistant Examiner.*